UNITED STATES PATENT OFFICE.

HENRY A. KOHMAN, CHARLES HOFFMAN, AND TRUMAN M. GODFREY, OF PITTSBURGH, PENNSYLVANIA, ASSIGNORS TO CHARLES ADAMS, TRUSTEE, OF NEW ROCHELLE, NEW YORK.

MANUFACTURE OF BREAD.

1,148,328.     Specification of Letters Patent.     Patented July 27, 1915.

No Drawing.     Application filed April 21, 1914. Serial No. 833,400.

*To all whom it may concern:*

Be it known that we, HENRY A. KOHMAN, CHARLES HOFFMAN, and TRUMAN M. GODFREY, all residing in the city of Pittsburgh, Allegheny county, State of Pennsylvania, have invented certain new and useful Improvements in the Manufacture of Bread; and we do hereby declare the following to be a full, clear, and exact description of the invention, such as will enable others skilled in the art to which it appertains to make and use the same.

Our invention relates, generally, to the manufacture of leavened bread, and is based upon the discovery that, by the employment of certain haloid acids and certain oxidizing haloid salts of the alkali and alkaline earth metals, during the process of fermentation, it is possible not only to improve the quality of the bread, but also to increase the yield of loaves of like weight from a given initial quantity of the bread-making ingredients, to lessen the quantity of yeast required for the fermentation, and to speed up the time required for aging or maturing of the dough during the fermenting operation, or, conversely, to lessen the amount of fermentation of the dough required to bring it to the standard degree of maturity.

The invention is applicable, in practice, both to the manufacture of bread by the sponge process and by the straight-dough process, which processes are so well known in the art that it is unnecessary to set them forth at length herein.

The invention is particularly useful in connection with the manufacture of bread from bolted hard wheat flours and is characterized by a decided whitening or clearing up of the color of the ultimate product, although the remaining advantages, hereinbefore indicated, and particularly the features of aging and yeast-saving are made manifest in the manufacture of bread from other flours, as, for instance, rye flour, and Graham flour.

The salts that we find particularly appropriate for the practice of the invention are potassium bromate and potassium iodate, which we especially recommend. Iodic and bromic acid may also be used.

When potassium bromate is employed, it is used, either in the sponge process or in the straight-dough process, in the proportion of .015 parts to 1000 parts of the flour in the dough batch, that is to say, approximately .024 oz. of potassium bromate to 100 lbs. of flour. When potassium iodate is employed, the requisite quantity of the salt for the attainment of the best results is less, *i. e.*, .005 parts of potassium iodate to 1000 parts of flour in the dough batch, that is to say approximately .008 oz. of potassium iodate to 100 lbs. of flour.

In carrying the invention into effect, the potassium bromate or potassium iodate is added to the batch, either at the commencement of the sponge process, or at the commencement of the straight-dough process, and the batch is thoroughly stirred so as to obtain as homogeneous a mixture as possible. It is found that when used in the proportions hereinbefore noted, the employment of the potassium bromate or potassium iodate permits the required fermentation of the batch within a given interval of time to take place with the employment of about 70% of the quantity of yeast usually required, *i. e.*, with a saving of 30% of yeast. This lessening of the fermentation required for bringing the dough to the normal degree of age or maturity results in a lesser consumption of sugar by the yeast, and consequently, a lesser production of alcohol and carbon dioxid, which, as is well known, are practically all ultimately driven off or eliminated in the bread-making process.

This saving in the consumption of the sugar otherwise converted into alcohol and carbon dioxid amounts to about 1%, as calculated upon the weight of flour employed, and is manifested in an increased yield starting from a given dough batch. So also, it is found that the water-absorbing power of flour is increased by about 2.5% calculated upon the flour, in consequence of which the weight of dough from a given weight of flour is materially increased. In practice, therefore, there is a net increased yield, in the loaves of bread obtainable from a given quantity of dough, which increased yield frequently amounts to as high as 3000 loaves in a total output of 100,000 loaves.

As hereinbefore indicated, the quality of the bread is improved by a whitening or clearing up effect incident to the use of the salts referred to, so that from flour of a given color, a whiter bread is produced than would otherwise be the case.

As hereinbefore indicated, the characteristic advantages of the invention can be realized by the employment of the haloid acids referred to (iodic acid and bromic acid), but, for general use, and for convenience, it will usually be preferable to employ a suitable derivative, as, for instance, the iodate or bromate. So also, we particularly recommend the bromate and iodate of potassium, although we may state that other bromates and iodates are likewise serviceable as, for instance, bromate of sodium, and iodates of ammonium, calcium, and sodium. In fact, broadly speaking, the characteristic advantages of the invention are presented, to a greater or less extent, in the employment of any appropriate oxidizing haloid compound, whether an acid, or a salt. We may say, however, in this connection, that we exclude the chlorates and the acids from which they are derived, as inappropriate to the uses of the invention.

We have also ascertained that the bromates and iodates can be employed for the purposes specified, without interfering with the action of certain salts used for assisting in the propagation of the yeast cells, as, for instance, the calcium salts and the ammonium salts. We wish it to be understood, therefore, that the practice of our invention is not confined to its use in the customary sponge process or straight dough process, but likewise extends to its use in said processes even though they may contemplate the employment of other salts.

In a divisional application for Letters Patent of the United States filed by us under date of November 27th, 1914, Ser. No. 874,182, we have described and claimed specifically that part of the present invention which consists in employing an oxidizing compound of iodin in the process referred to: that is to say, iodic acid, or a suitable derivative thereof, as, for instance, an iodate, and particularly the iodate of potassium. Accordingly, this specific aspect of the invention is not claimed in the present case.

Having thus described our invention, what we claim is:—

1. The process of making leavened bread, which comprises incorporating an appropriate and innocuous oxidizing bromin compound with the yeast, flour and other ingredients of the dough batch, and fermenting the batch; substantially as described.

2. The process of making leavened bread, which comprises incorporating an appropriate and innocuous alkali metal salt of an oxidizing acid of bromin, with the yeast, flour and other ingredients of the dough batch, and fermenting the batch; substantially as described.

3. The process of making leavened bread, which comprises incorporating an appropriate and innocuous oxidizing bromine salt of potassium with the yeast, flour and other ingredients of the dough batch, and fermenting the batch; substantially as described.

4. The process of making leavened bread, which comprises incorporating potassium bromate with the yeast, flour, and other ingredients of the dough batch, and fermenting the batch; substantially as described.

5. The process of making leavened bread, which comprises incorporating about .015 parts of potassium bromate to 1000 parts of flour, with the yeast, flour, and other ingredients of the dough batch, and fermenting the batch; substantially as described.

In testimony whereof we affix our signatures, in presence of two witnesses.

HENRY A. KOHMAN.
CHARLES HOFFMAN.
TRUMAN M. GODFREY.

Witnesses:
 Ed. C. Chance,
 E. Stevinson.